United States Patent
Dawson et al.

(10) Patent No.: US 8,312,449 B2
(45) Date of Patent: Nov. 13, 2012

(54) VIRAL INSTALLATION OF OPERATING SYSTEMS IN A NETWORK

(75) Inventors: Christopher J. Dawson, Arlington, VA (US); Peter G. Finn, Brampton (CA); Rick A. Hamilton, II, Charlottesville, VA (US); James W. Seaman, Falls Church, VA (US); Timothy M. Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 1387 days.

(21) Appl. No.: 11/554,836

(22) Filed: Oct. 31, 2006

(65) Prior Publication Data

US 2008/0127172 A1    May 29, 2008

(51) Int. Cl.
*G06F 9/445* (2006.01)
*G06F 9/44* (2006.01)

(52) U.S. Cl. .......................................... 717/178; 717/173
(58) Field of Classification Search .................... 717/178
See application file for complete search history.

(56) References Cited

U.S. PATENT DOCUMENTS

| | | | |
|---|---|---|---|
| 5,737,610 A | 4/1998 | Sandig et al. | |
| 5,764,984 A | 6/1998 | Loucks | |
| 5,802,365 A | 9/1998 | Kathail et al. | |
| 5,845,090 A * | 12/1998 | Collins et al. | 709/221 |
| 6,066,182 A | 5/2000 | Wilde et al. | |
| 6,094,679 A * | 7/2000 | Teng et al. | 709/220 |
| 6,115,741 A | 9/2000 | Domenikos et al. | |
| 6,182,275 B1 | 1/2001 | Beelitz et al. | |
| 6,219,742 B1 | 4/2001 | Stanley | |
| 6,457,122 B1 | 9/2002 | Ramezani | |
| 6,477,624 B1 | 11/2002 | Kedem et al. | |
| 6,477,642 B1 | 11/2002 | Lupo | |
| 6,557,054 B2 | 4/2003 | Reisman | |
| 6,564,252 B1 | 5/2003 | Hickman et al. | |
| 6,615,405 B1 | 9/2003 | Goldman et al. | |
| 6,658,486 B2 | 12/2003 | Buzbee et al. | |
| 6,662,198 B2 | 12/2003 | Satyanarayanan et al. | |
| 6,938,250 B2 | 8/2005 | Cohen et al. | |
| 7,162,538 B1 * | 1/2007 | Cordova | 709/238 |
| 7,272,645 B2 * | 9/2007 | Chang et al. | 709/223 |
| 7,580,972 B2 * | 8/2009 | Jones et al. | 709/203 |
| 7,617,300 B2 * | 11/2009 | Bjorg | 709/221 |
| 7,640,339 B1 * | 12/2009 | Caronni et al. | 709/224 |
| 7,673,131 B2 * | 3/2010 | Azzarello et al. | 713/2 |
| 7,680,799 B2 * | 3/2010 | Jackson et al. | 707/770 |

(Continued)

OTHER PUBLICATIONS

U.S. Appl. No. 09/731,629, filed Dec. 7, 2000, French et al.

(Continued)

*Primary Examiner* — Don Wong
*Assistant Examiner* — Marina Lee
(74) *Attorney, Agent, or Firm* — Mark Vallone; Robert C. Rolnik (57) ABSTRACT

A method of viral installation of operating systems in a network includes determining a target group of computers at a master computer, installing an operating system image, the operating system image including a viral installation controller, from the master computer to the target group based on the target group determination, determining a first associated group of computers at least one target group computer, and installing the operating system image and viral installation controller on the first associated group from the target group based on the first associated group determination. A computer readable medium including computer readable code is also disclosed.

7 Claims, 11 Drawing Sheets

U.S. PATENT DOCUMENTS

| | | | |
|---|---|---|---|
| 7,779,097 B2 * | 8/2010 | Lamkin et al. | 709/223 |
| 8,180,853 B2 * | 5/2012 | Lee et al. | 709/218 |
| 2003/0131129 A1 * | 7/2003 | Becker et al. | 709/238 |
| 2003/0149917 A1 * | 8/2003 | Smith et al. | 714/38 |
| 2004/0006586 A1 * | 1/2004 | Melchione et al. | 709/201 |
| 2004/0019889 A1 * | 1/2004 | Melchione et al. | 717/177 |
| 2004/0117338 A1 | 6/2004 | Kennedy et al. | |
| 2005/0091348 A1 | 4/2005 | Ferri et al. | |
| 2006/0047946 A1 * | 3/2006 | Keith | 713/2 |
| 2006/0136526 A1 * | 6/2006 | Childress et al. | 707/205 |
| 2006/0282510 A1 * | 12/2006 | Preimesberger | 709/217 |
| 2007/0043831 A1 * | 2/2007 | Kessler et al. | 709/219 |
| 2007/0260868 A1 * | 11/2007 | Azzarello et al. | 713/2 |
| 2008/0027950 A1 * | 1/2008 | Fukumi | 707/10 |
| 2008/0127172 A1 * | 5/2008 | Dawson et al. | 717/174 |

OTHER PUBLICATIONS

U.S. Appl. No. 09/731,624, filed Dec. 7, 2000, French et al.

U.S. Appl. No. 09/731,631, filed Dec. 7, 2000, French et al.

International Business Machines Corporation; IBM Tivoli Storage Manager for System Backup and Recovery; Tivoli software; Sep. 21, 2005; IBM.

Sun Microsystems, Inc.; Solaris 10 Self Help; Jul. 19, 2006; Sun Microsystems, Inc.

Apple Computer, Inc.; Network Install; Mar. 2005; Apple Computer, Inc.; Jun. 24, 2006; Apple Computer, Inc.

Bootix Technology GmbH; http://bootix.com/products/tcpip_boot_prom_en.html; Aug. 8, 2006; bootix Technology.

Crossbow Technology, Inc.; Wireless Network Sensors; Jul. 16, 2006; Crossbow Technology, Inc.

R-Tools Technology, Inc.; Drive Image; http://www.drive-image.com/; Aug. 4, 2006.

Linux Utilities; Linux Programmer's Manual; Oct. 14, 1994; http://web.archive.org/web/20060630121500/http://unixhelp.ed.ac.uk/CGI/man-cgi?kill.

* cited by examiner

VIRAL INSTALLATION OF OPERATING SYSTEMS IN A NETWORK

FIELD OF INVENTION

The present invention generally relates to installation of operating systems. More specifically, the invention relates a method for viral installation of operating systems in a network.

BACKGROUND OF THE INVENTION

Installation of operating systems on large numbers of computers over large networks is a time-consuming process. The problem is particularly relevant when attempting to update networks that have large numbers of homogenous nodes in a dynamic, external environment.

Automated software installation has developed and is now commonplace. Automated software installation is common as most computers are purchased with an operating system (i.e. Windows, UNIX, LINUX, MacOS, Novell, AIX, or the like) and many computers are subsequently repurposed. In such a case, the computers to be updated/installed are connected to network backbone. The network can be wired or wireless and utilize different transport mechanisms. The transport mechanisms includes collision based electronic transfer, direct RF wireless transfer, infrared, or other optical modes. Several protocols, including TCP/IP, are available. Using these resources, software can be installed with little human intervention.

In a smart dust network, these problems are exacerbated. The smart dust, also termed motes, are low power sensing, computing and transmission platforms that can be dispersed in an environment and transfer environmental information back to a central source. For example, Crossbow Technologies offers a line of wireless sensor networks. The Crossbow Technologies offerings operate on a proprietary TinyOS, but more advanced operating systems can be adapted to run on smart dust machines.

Figure 7:
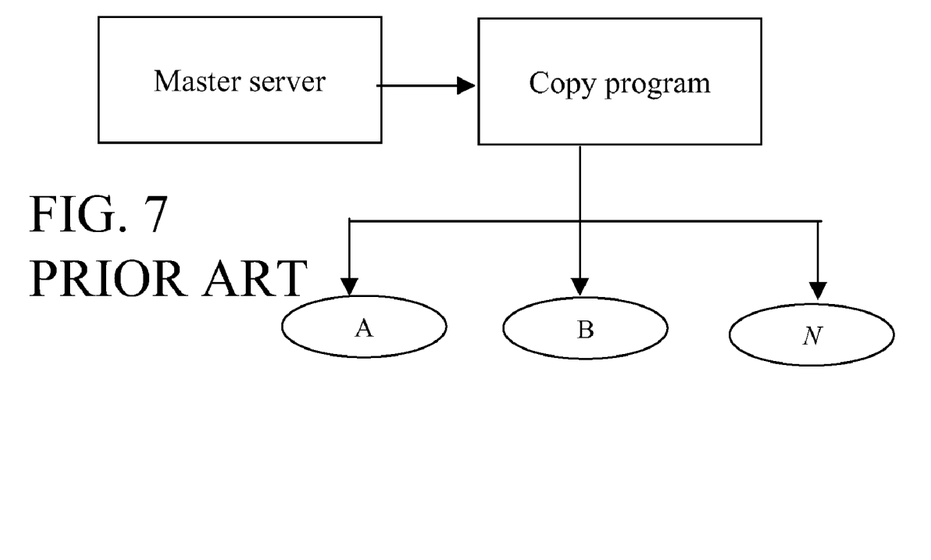
FIGS. 7 and 8 illustrate prior art solutions for operating system installation.
Figure 8:
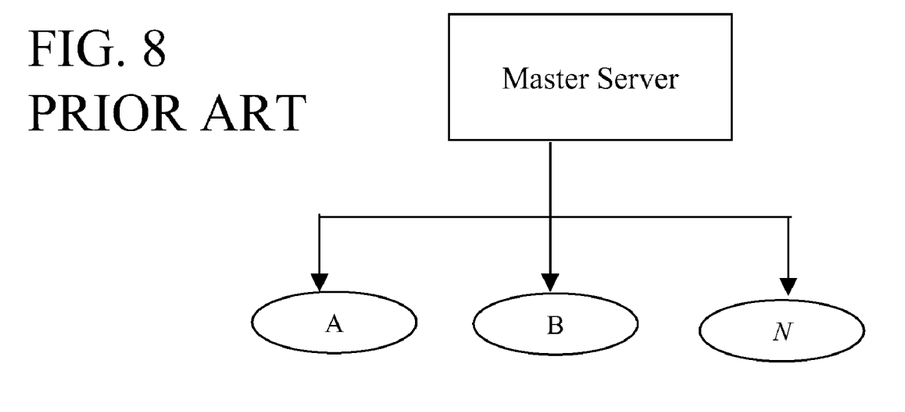

Current operating systems (OS) are generally installed using one of two techniques—a device specific copy program is attached to chained media devices, and the OS is installed onto the chained media devices by the copy program, or a master computer server installs the OS using a client/server network. The chained media technique is graphically illustrated in prior art FIG. 7, while the client/server paradigm is graphically illustrated in prior art FIG. 8. Use of the device specific copy program is undesirable due to the need to purchase the specialized program and equipment, as well as update and maintain the program. In addition, devices need to be installed and removed from the chain, and there is little testing of system hardware during the installation. Conversely, systems utilizing the client/server paradigm, while reducing the need for the specialized programs, quickly saturate the capacity of the server, and can be time consuming, as the throughput of the entire system is then limited to the throughput of the server.

It is therefore a challenge to develop a method to install operating systems to overcome these, and other, disadvantages.

SUMMARY OF THE INVENTION

A first embodiment of the invention includes a method of viral installation of operating systems in a network. The method includes receiving an operating system image from a master computer at a target computer, the master computer and target computer in communication with a peer-to-peer network and the operating system image including a viral installation controller, determining a first associated group of computers at the target computer, the first associated group of computers in communication with at least the target computer with a peer-to-peer network, and wherein each of the first associated group of computers does not have the operating system image including the viral installation controller; and installing the operating system including the viral installation controller on at least one of the first associated group from the target computer based on the associated group determination.

A second embodiment of the invention includes a method of viral installation of operating systems in a network. The method includes receiving an operating system image from a master computer at a target computer. The master computer and target computer are in communication via a peer-to-peer network and the operating system image includes a viral installation controller. The method further includes determining a first associated group of computers at the target computer, the first associated group of computers in communication with at least the target computer with a peer-to-peer network, and wherein each of the first associated group of computers does not have the operating system image including the viral installation controller, and installing the operating system including the viral installation controller on at least one of the first associated group from the target computer based on the associated group determination.

A third embodiment of the invention includes a computer readable medium including computer readable code for viral installation of operating systems in a network. The medium includes computer readable code for receiving an operating system image from a master computer at a target computer. The master computer and target computer are in communication via a peer-to-peer network and the operating system image includes a viral installation controller. The medium further includes computer readable code for determining a first associated group of computers at the target computer, the first associated group of computers in communication with at least the target computer with a peer-to-peer network, and wherein each of the first associated group of computers does not have the operating system image including the viral installation controller, and computer readable code for installing the operating system including the viral installation controller on at least one of the first associated group from the target computer based on the associated group determination.

Yet another aspect of the invention provides a computer readable medium including computer readable code for viral installation of operating systems in a network. The medium includes computer readable code for receiving an operating system image from a master computer at a target computer, the master computer and target computer in communication with a peer-to-peer network and the operating system image including a viral installation controller, computer readable code for determining a first associated group of computers at the target computer, the first associated group of computers in communication with at least the target computer with a peer-to-peer network. Each of the first associated group of computers does not have the operating system image including the viral installation controller. The medium further includes computer readable code for installing the operating system including the viral installation controller on at least one of the first associated group from the target computer based on the associated group determination.

The foregoing embodiment and other embodiments, objects, and aspects as well as features and advantages of the present invention will become further apparent from the following detailed description of various embodiments of the present invention. The detailed description and drawings are merely illustrative of the present invention, rather than limiting the scope of the present invention being defined by the appended claims and equivalents thereof.

DETAILED DESCRIPTION OF THE PRESENT INVENTION

Figure 1:
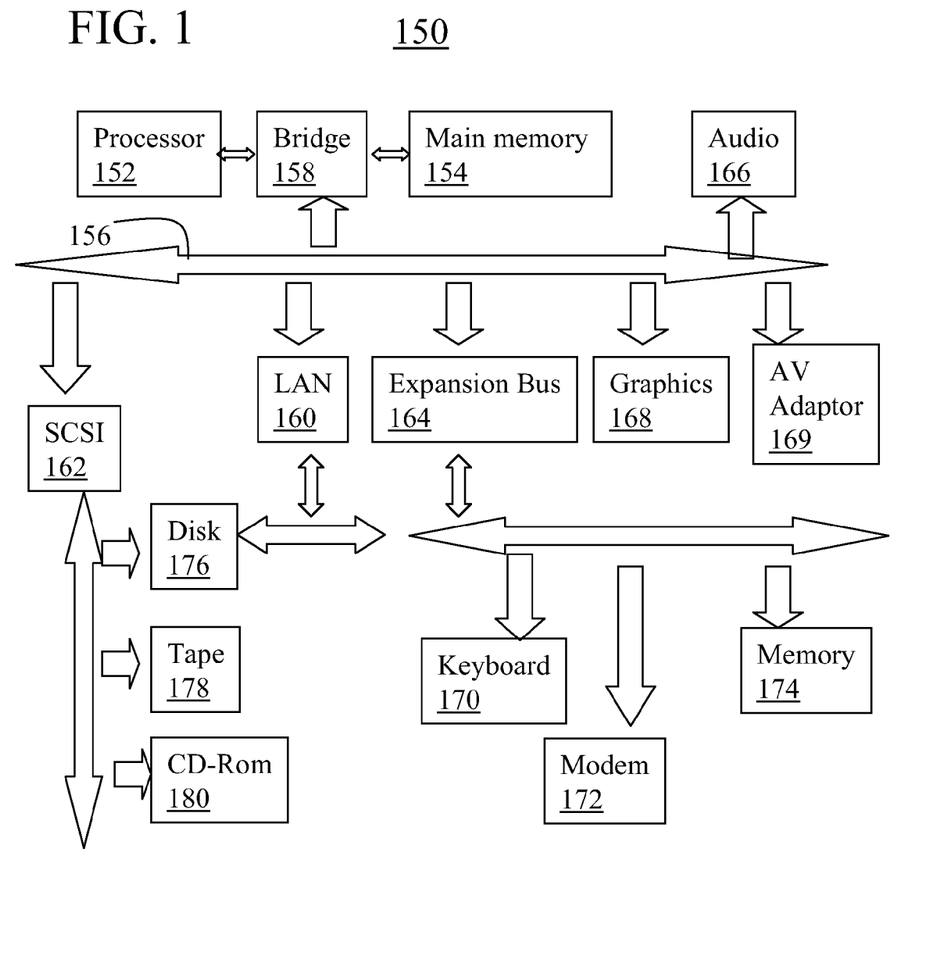
FIG. 1 illustrates one embodiment of a computer client, in accordance with one aspect of the invention.
Figure 2:
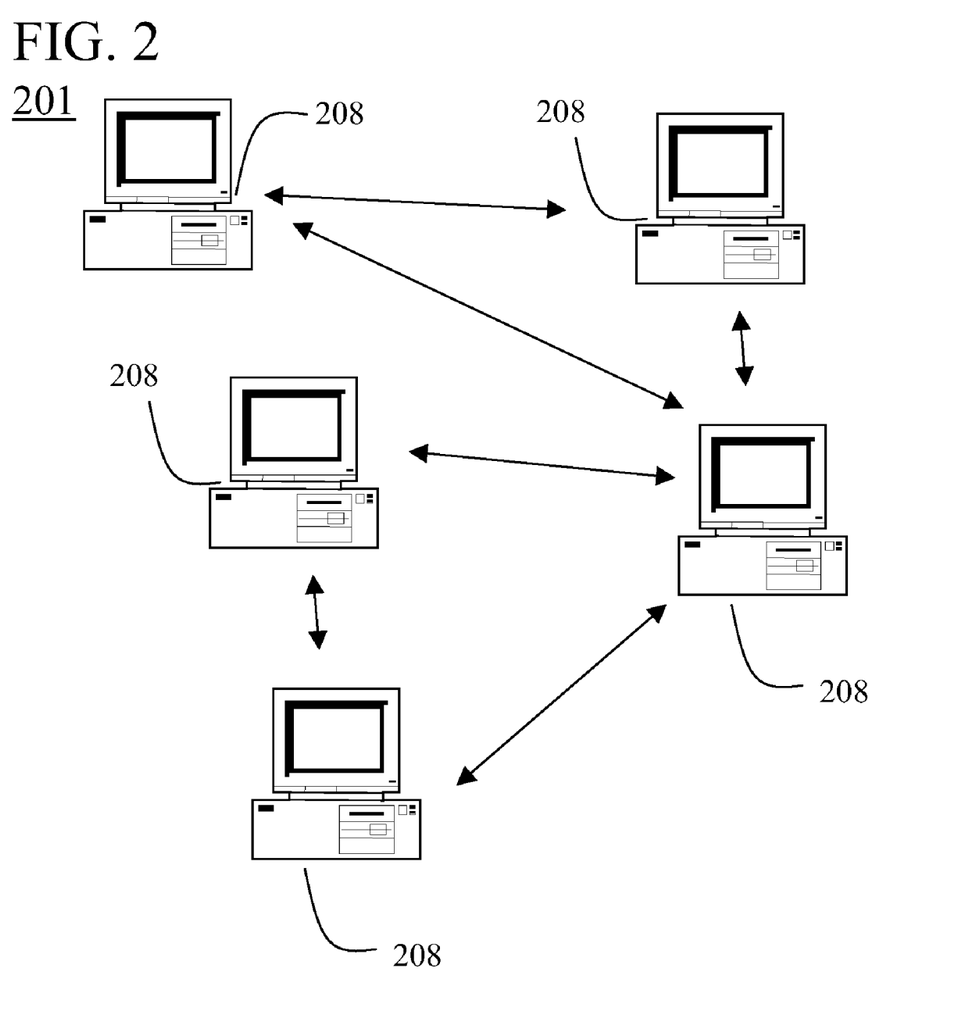
FIG. 2 illustrates one embodiment of a network for use in accordance with one aspect of the invention

FIG. 1 illustrates one embodiment of a computer 150 for use in accordance with one aspect of the invention. Computer 150 is an example of a master computer or target computer, such as computers 208, 210, and 212 (FIG. 2). Computer 150 employs a peripheral component interconnect (PCI) local bus architecture. Although the depicted example employs a PCI bus, other bus architectures such as Micro Channel and ISA may be used. PCI bridge 158 connects processor 152 and main memory 154 to PCI local bus 156. PCI bridge 158 also may include an integrated memory controller and cache memory for processor 152. Additional connections to PCI local bus 156 may be made through direct component interconnection or through add-in boards. In the depicted example, local area network (LAN) adapter 160, SCSI host bus adapter 162, and expansion bus interface 164 are connected to PCI local bus 156 by direct component connection. In contrast, audio adapter 166, graphics adapter 168, and audio/video adapter (A/V) 169 are connected to PCI local bus 156 by add-in boards inserted into expansion slots. Expansion bus interface 164 connects a keyboard and mouse adapter 170, modem 172, and additional memory 174 to bus 156. SCSI host bus adapter 162 provides a connection for hard disk drive 176, tape drive 178, and CD-ROM 180 in the depicted example. In one embodiment, the PCI local bus implementation support three or four PCI expansion slots or add-in connectors, although any number of PCI expansion slots or add-in connectors can be used to practice the invention.

An operating system runs on processor 152 to coordinate and provide control of various components within computer 150. The operating system may be any appropriate available operating system such as Windows, Macintosh, UNIX, LINUX, or OS/2, which is available from International Business Machines Corporation. "OS/2" is a trademark of International Business Machines Corporation. Instructions for the operating system, an object-oriented operating system, and applications or programs are located on storage devices, such as hard disk drive 176 and may be loaded into main memory 154 for execution by processor 152.

Those of ordinary skill in the art will appreciate that the hardware in FIG. 1 may vary depending on the implementation. For example, other peripheral devices, such as optical disk drives and the like may be used in addition to or in place of the hardware depicted in FIG. 1. FIG. 1 does not illustrate any architectural limitations with respect to the present invention, and rather merely discloses an exemplary system that could be used to practice the invention. For example, the processes of the present invention may be applied to multiprocessor data processing system.

FIG. 2 illustrates an exemplary peer-to-peer network system 201. Network system 201 is a network of computers in which the present invention may be implemented. Network system 201 includes a number of computers 208 each communicatively linked to the others via the other computers 208 without a central server. Network system 201 may include permanent connections, such as wire or fiber optic cables, or temporary connections made through telephone connections. In other embodiments, network 201 includes wireless connections using any appropriate wireless communications protocol including short range wireless protocols such as a protocol pursuant to FCC Part 15, including 802.11, Bluetooth or the like, or a long range wireless protocol such as a satellite or cellular protocol. Each computer 208 can be implemented in a similar fashion as computer 150 described with reference to FIG. 1.

Figure 3:
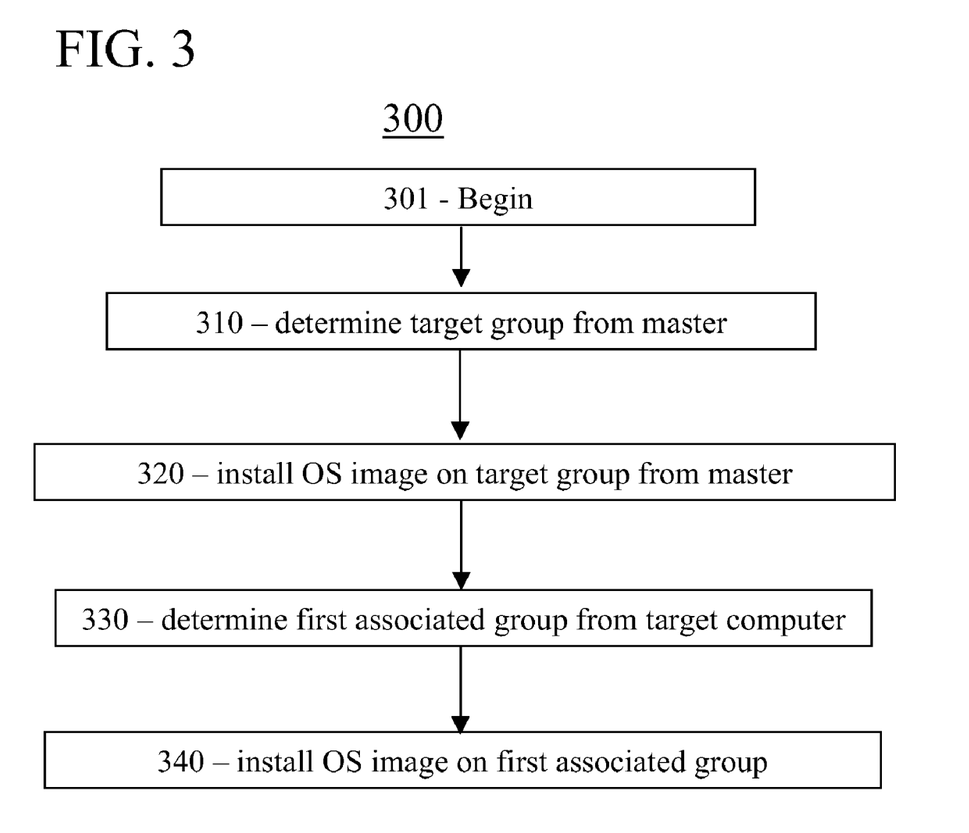
FIG. 3 illustrates one embodiment of a method for viral installation of an operating system, in accordance with one aspect of the invention.

FIG. 3 illustrates one embodiment of a method 300 for viral installation of an operating system, in accordance with one aspect of the invention. Method 300 begins at 301. At step 310, a master computer determines a target group of computers. The master computer is any computer that includes a version of an operating system image that is to be replicated to a number of target computers using a network connection. Target computers are computers connected to the master computer with the network, but target computers do not have the operating system image. The network is implemented as a peer-to-peer network, in one embodiment. In other embodiments, the network is implemented as a wide area network, local area network, intranet, and the Internet. An operating system image is any executable application to provide operating system functionality. The operating system image includes a viral installation controller for installing the operating system image on target computers. A viral installation controller is software instructions for replicating an operating system as well as the viral installation controller to at least one other computer and instructions for locating other target computers on a network. The viral installation controller includes, in one embodiment, at least one software switch for activating or deactivating the functionality. In one embodiment, the software switch resets in the event of a failed or interrupted installation.

In one embodiment, the target group is determined over a network using a ping to locate a computer and a challenge/response based on the ping return. In another embodiment, the network is polled to locate new target computers. In yet another embodiment, each viral installation controller sends a spider to crawl the network to locate target computers. In another example, the master computer can receive a message from a computer that does not include the OS group. Alternatively, other standard UNIX protocols and services, including TCP/IP, NIM, NFS and TFTP can enable the logic disclosed herein. In one embodiment, once a target computer identifies itself to a master computer, the target computer actuates a software switch indicating that the target is either updated or being updated to prevent the acquired target from acquisition by a different master computer.

Based on the determination of the target group, the master computer installs the operating system image including the viral installation controller on at least one computer of the target group, at step 320. The installation is implemented with a series of messages and file transfers across the network. Techniques for OS installation are known in the art.

After installing the OS image on at least one computer in the target group, the at least one computer of the target group determines a first associated group at step 330. The determination of the first associated group is accomplished in a similar fashion as determining the target group. For example, a spider can crawl the network to locate computers that do not include the OS image. In another example, the target group can receive a message from a computer that does not include the OS group.

The OS is then installed on the first associated group by the target group at step 340. The installation is implemented with a series of messages and file transfers over the network. Other networked OS installation techniques can also be used.

Figure 4:
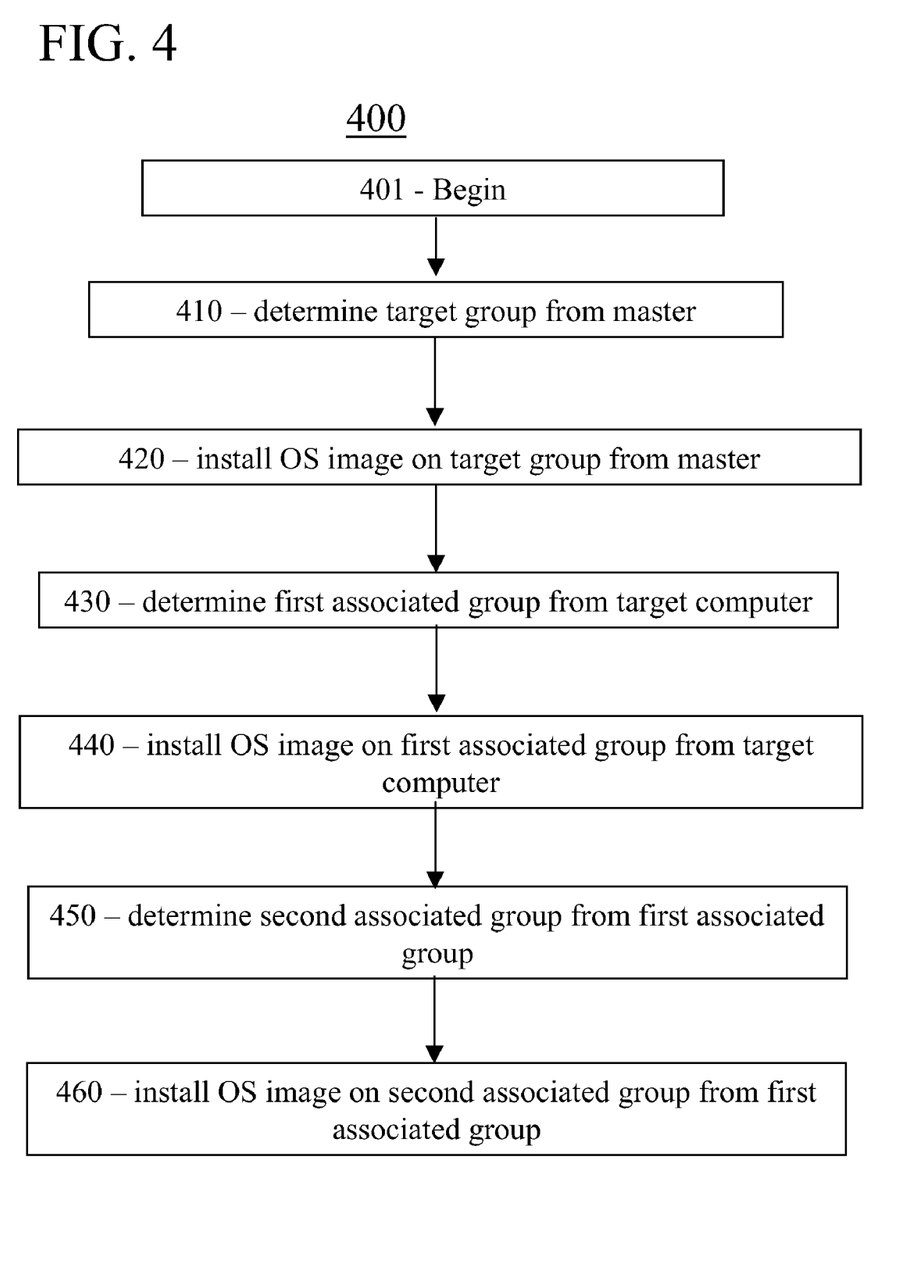
FIG. 4 illustrates one embodiment of a method for viral installation of an operating system, in accordance with one aspect of the invention.

FIG. 4 illustrates one embodiment of a method 400 for viral installation of an operating system, in accordance with one aspect of the invention. Method 400 begins at 401. Method steps 410, 420, 430, and 440 are implemented as in steps 310, 320, 330, and 340, respectively.

At step 450, method 400 determines a second associated group from at least one computer of the first associated group. At step 460, the operating system image and viral installation controller are installed on the second associated group from the first associated group based on the determination of the second associated group. In such fashion, the installation of the OS can virally grow. Thus, if each computer can simultaneously install the OS on 10 computers in one cycle—after one cycle, 11 computers have the OS (master computer plus 10 targets), after two cycles, 121 computers have the OS (11+11*10) and so on. Depending on network conditions such as size, bandwidth, and number of computers remaining to receive the OS, the viral growth can be exponential, geometric, or serial. Under ideal algorithmic conditions (i.e. a large number of computers to receive the OS, ample bandwidth, etc.) the viral growth will be exponential, although the speed of growth will fall from exponential as fewer computers remain or bandwidth becomes increasingly occupied.

In one embodiment, the determination of the first associated group includes determining whether additional computers in the network require the OS. This determination can include polling the network, pinging the network, receiving messages from such a computer, or the like. Those of skill in the art will recognize that each computer without the OS will generally include some bootstrap or similar program for issuing and receiving a limited instruction set.

In order to determine a group of targets, such as the target group, first associated group, or second associated group, a delivery threshold is first determined. A delivery threshold is a measure of the number of targets that a particular computer can substantially simultaneously install the OS upon. In one embodiment, the method attempts to determine a maximum number of associated computers as the delivery threshold.

The delivery threshold is determined in response to network bandwidth in one embodiment. In another embodiment, the delivery threshold is determined in response to network traffic. In another embodiment, the delivery threshold is responsive to CPU utilization, CPU cycles, clock speed, or memory considerations. In another embodiment, the delivery threshold is responsive to storage space considerations, such as memory size, memory allocation, or memory access limitations. In another embodiment, a maximum delivery threshold is hard coded into the system so that no master computer can exceed installations on an excessive number of computers. Such a limitation can reduce any disparate impact of installation services on a single machine.

In one embodiment, the viral installation controller is removable from the operating system. Removing the viral installation controller can be accomplished by deleting routines or subroutines associated with the viral installation controller, deleting applications or libraries associated with the viral installation controller, changing the functionality of the viral installation controller, such as be disallowing the viral installation controller access to computer resources, or similar changes.

In one embodiment, the method completes installation of the operating system on the target computer, and removes the viral installation controller from the master computer based on the completing. In such embodiments, overall throughput of the operating system is reduced as one 'master computer' is no longer serviceable to install the operating system, but after removal of the viral installation controller, each computer can dedicate resources to other applications.

In yet another embodiment, at least one permanent master is determined, wherein the viral installation controller is not removed from the permanent master. In such an embodiment, the drag on system throughput resulting from unneeded OS installation resources is reduced, while maintaining the ability to exponentially expand OS installation services upon introduction of new target computers to the peer-to-peer network.

In another embodiment, the method removes the viral installation controller only after a determination that the network is not in communication with any additional potential targets. In such embodiments, overall resource allocation is improved after installation of the operating system, as no devices remain available to update the operating system. However, in such embodiments, the ability to introduce new devices to the network is limited, as no devices are available to install the OS.

Figure 5:
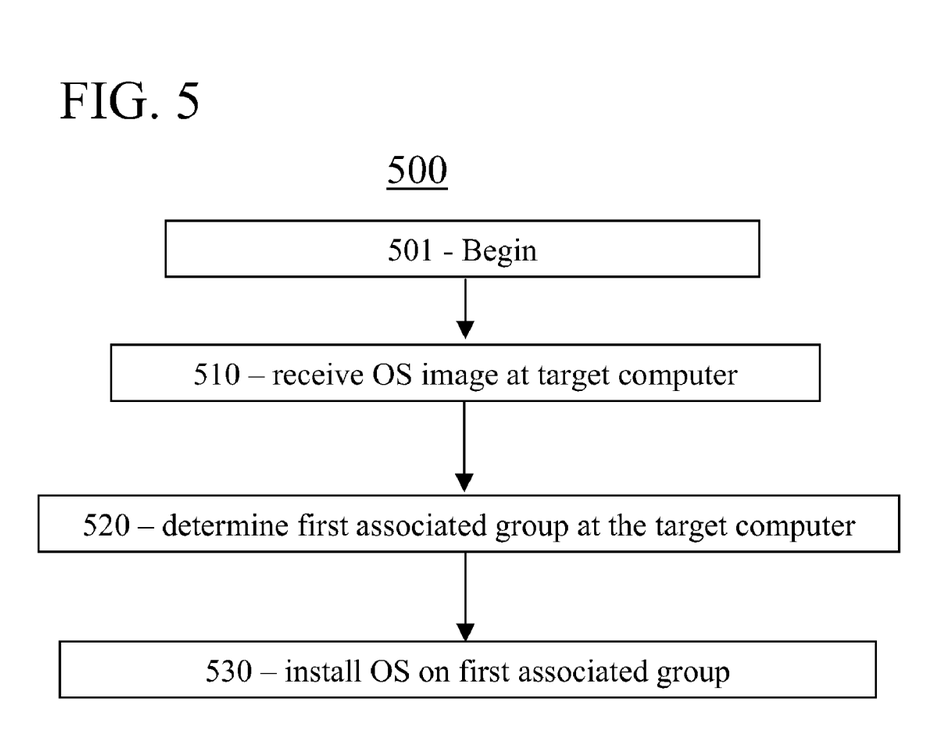
FIG. 5 illustrates one embodiment of a method for viral installation of an operating system, in accordance with one aspect of the invention.

FIG. 5 illustrates one embodiment of a method 500 for viral installation of an operating system, in accordance with one aspect of the invention. Method 500 begins at 501. An OS image including a viral installation controller is received from a master computer at a target computer at step 510. The master computer and target computer are in communication via a peer-to-peer network. Having received the OS, the target computer determines a first associated group of computers in communication with the target computer with a peer-to-peer network at step 520. Each of the determined first associated group does not include the received OS.

The OS and viral installation controller are then installed on the first associated group at step 530. The installation is based on the determination of the associated group.

Figure 6:
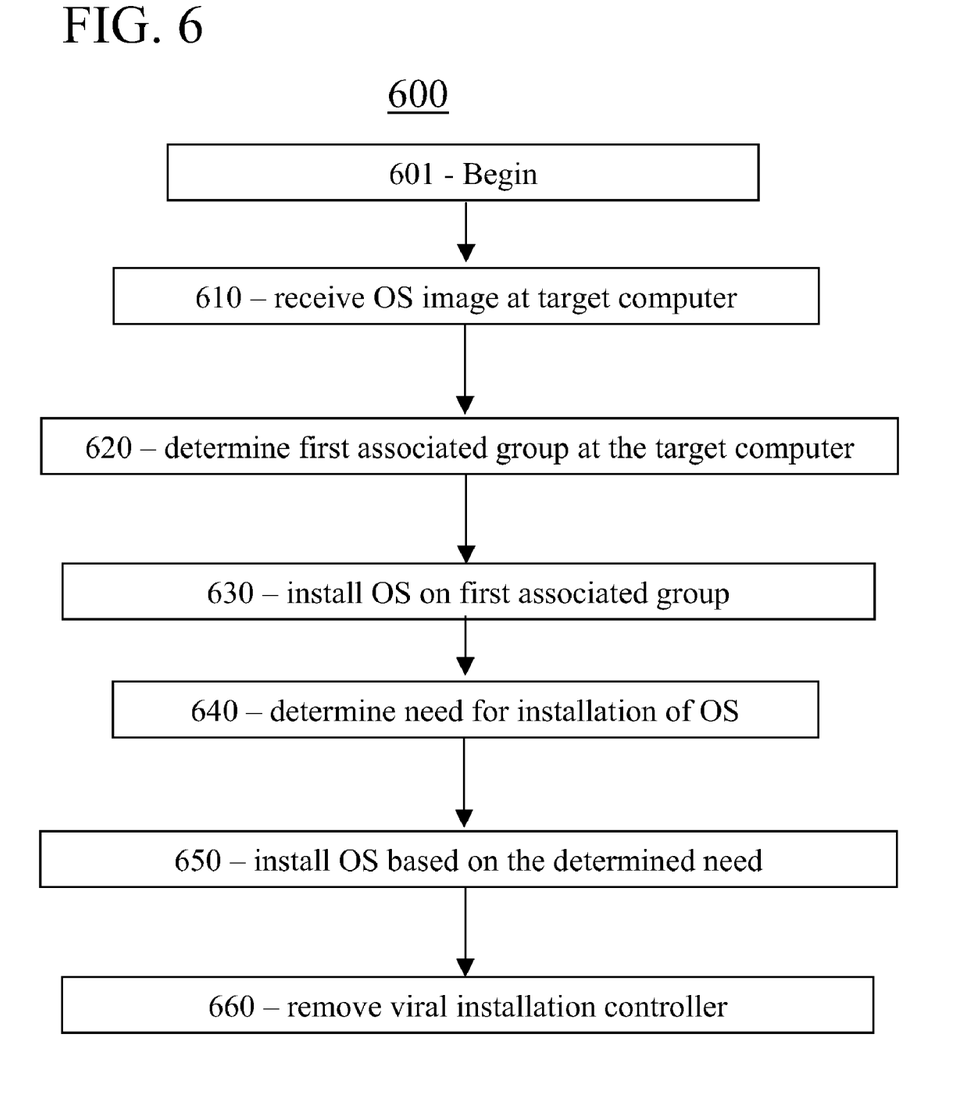
FIG. 6 illustrates one embodiment of a method for viral installation of an operating system, in accordance with one aspect of the invention.

FIG. 6 illustrates one embodiment of a method 600 for viral installation of an operating system, in accordance with one aspect of the invention. Method 600 begins at 601. Method steps 610, 620, and 630 are implemented as in steps 510, 520, and 530, respectively.

At step 640, method 600 determines whether additional computers in the peer-to-peer network require installation of the operating system image. This determination can be responsive to pings or messages received from network spiders. Alternatively, the bootstrap programs from each computer on the peer-to-peer network transmit a request for the OS until the OS is installed or in the process of receiving the OS. In one embodiment, once a target computer identifies itself to a master computer, the target computer actuates a software switch indicating that the target is either updated or being updated to prevent the acquired target from acquisition by a different master computer.

Based on the determination, the OS image and viral installation controller are installed at step 650, and the viral installation controller is removed from the target computer based on the installing at step 660.

Figure 9:
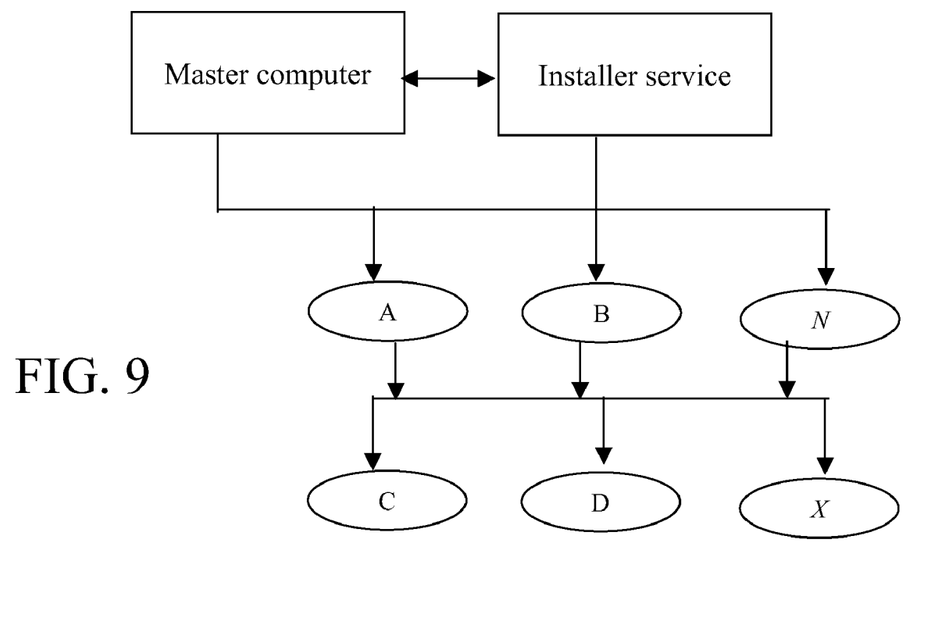
FIG. 9 illustrates a schematic of a system for viral installation of an operating system, in accordance with one aspect of the invention.
Figure 10:
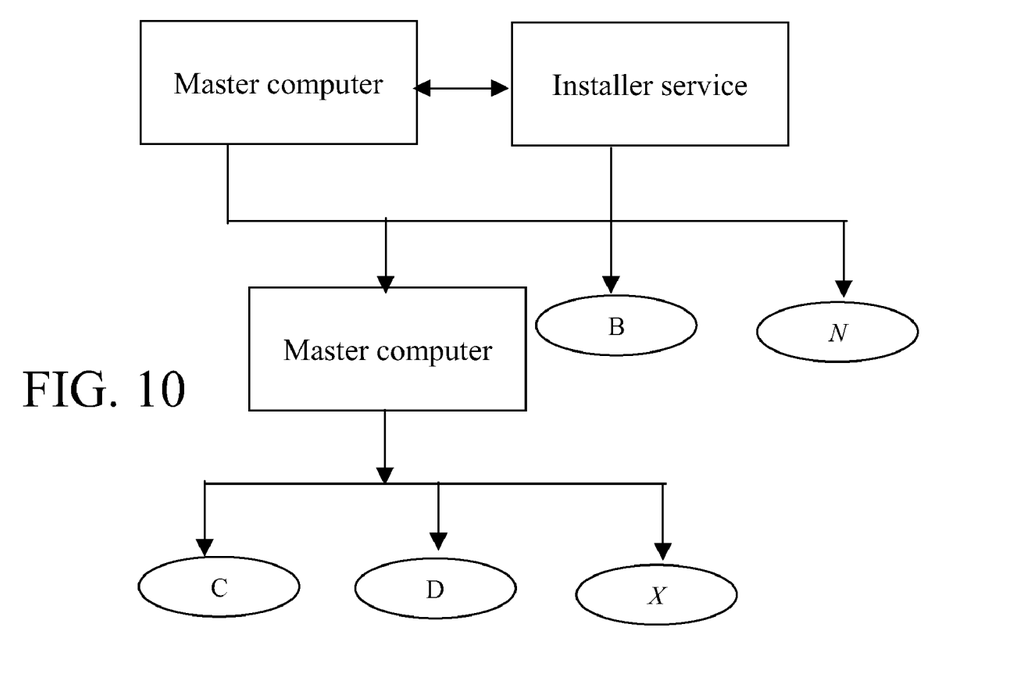
FIG. 10 illustrates a schematic of a system for viral installation of an operating system, in accordance with one aspect of the invention.

FIG. 9 is a schematic diagram of a method for viral installation of operating systems in a network. In FIG. 9, the master server is in bilateral communication with an installer service, and also in communication with a plurality of target computers A, B, . . . N over a peer-to-peer network. In addition, each of the master server and target computers A, B, . . . N are in communication with a plurality of first associated computers C, D, . . . X FIG. 10 illustrates the system of FIG. 9, with target computer A having received the operating system and viral installation controller so that target computer A now has the same functionality as a master computer, and the device formerly identified as target computer A can install the operating system on first associated group C, D, . . . X.

Figure 11:
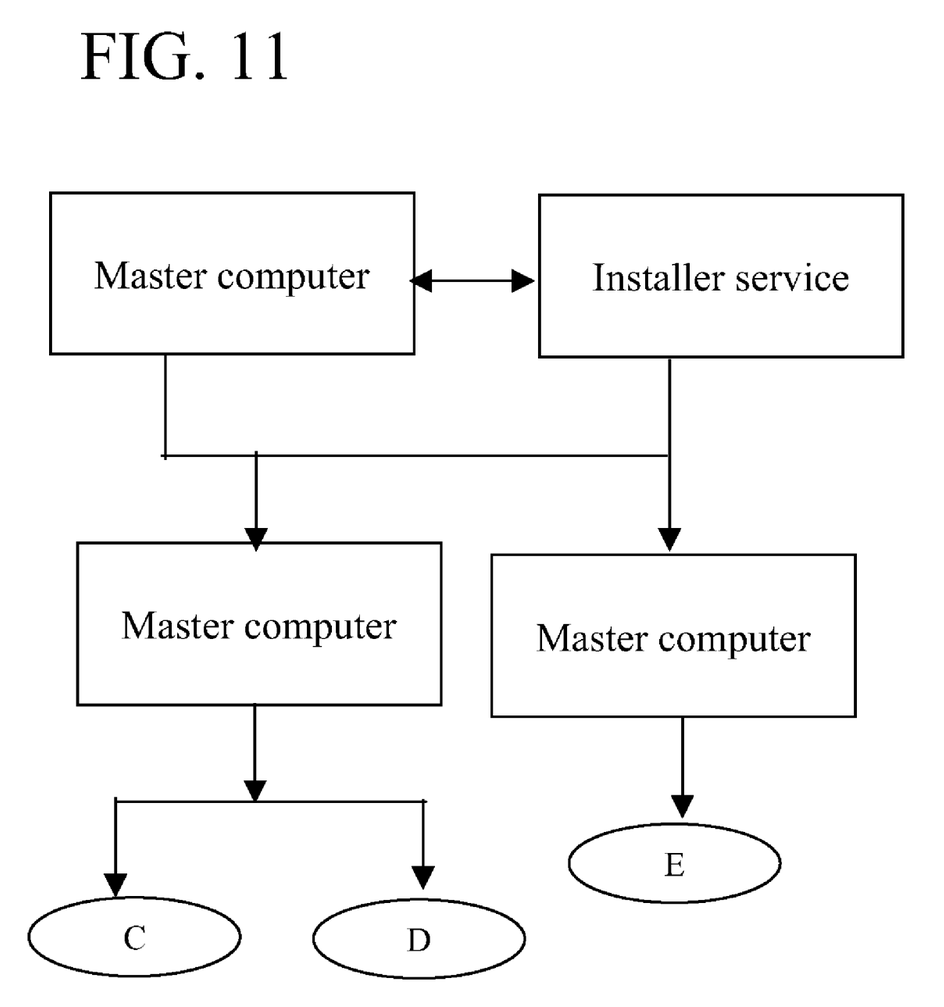
FIG. 11 illustrates a schematic of a system for viral installation of an operating system, in accordance with one aspect of the invention.

FIG. 11 illustrates the system of FIG. 9 with both target computer A and target computer B installed so that target computer A and target computer B can install the operating system. To increase bandwidth utilization, first associated computer C and first associated computer D are communicating with master computer A while first associated computer E is communicating with master computer B. FIG. 11 illustrates load balancing so that new and in process OS installations are assigned by the least busy install computer. Any appropriate technique for the determination of "least busy" can be utilized. For example, a determination of least busy can be based on bandwidth utilization, CPU cycle utilization, memory considerations, physical distance, network distance, or the like.

Figure 12:
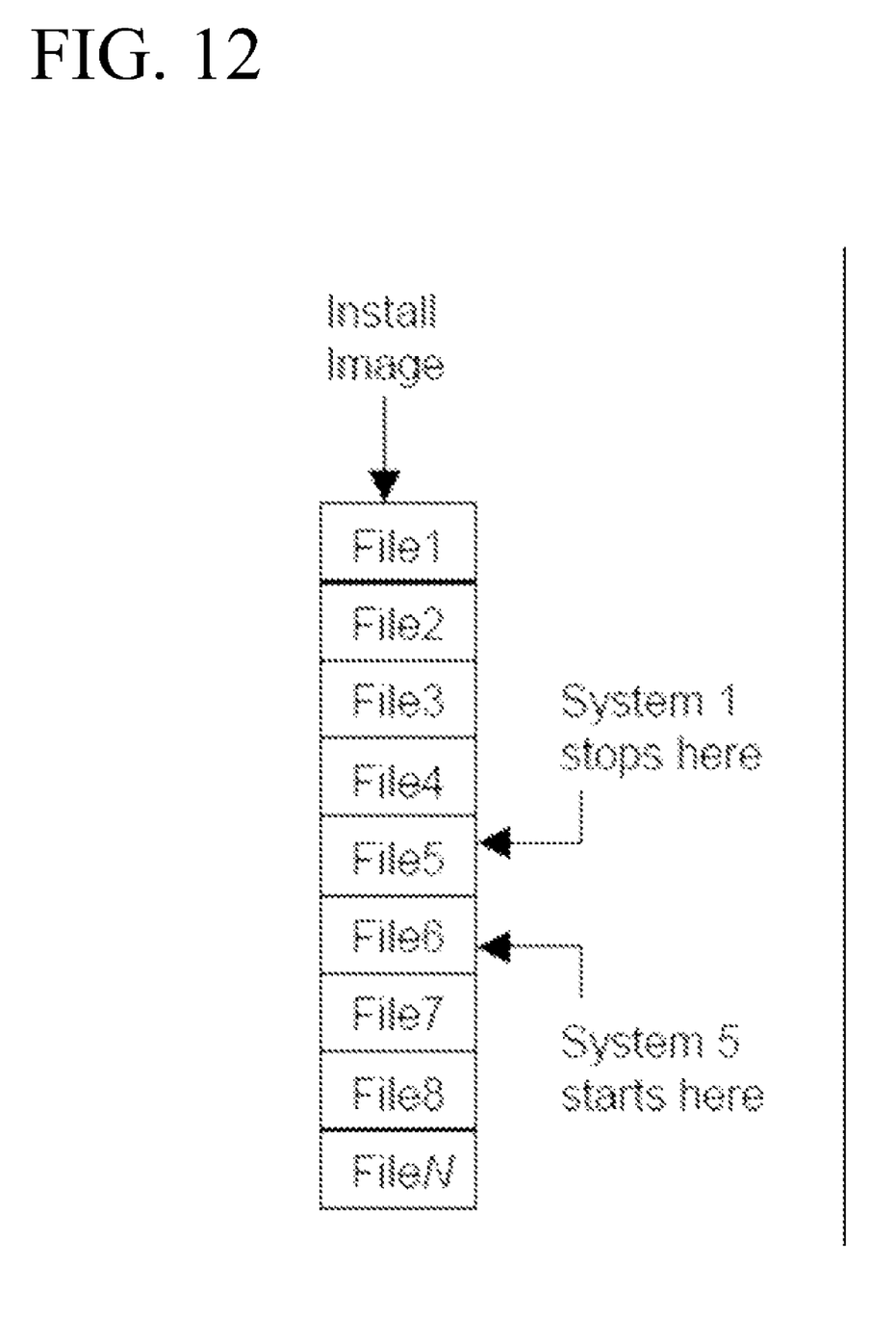
FIG. 12 illustrates a schematic of a target computer, in accordance with one aspect of the invention.

FIG. 12 illustrates a schematic view of a single target computer receiving the OS from two masters simultaneously. In the case of a load balancing embodiment of the invention, FIG. 12 illustrates that a target computer can be reassigned to different master computers while in process of OS installation. Embodiments that feature load balancing include increased communications loads as master computers communicate their status to other master computers, but any reduction in throughput occasioned by the increased communications load may be offset by increased network efficiencies as tasks are shared.

In one embodiment, special rules apply for physical servers that use logical network devices. In such a case, an individual server may have more logical networks than physical network adapters, and additional rules will apply to ration physical network adapters to logical network devices. These rules can include first in first out, last in last out, first in last out, priority schemes, or the like. For example, the eServer p595 offered by IBM can have many more logical networks (virtual Ethernets formed from memory to memory connections between logical system partitions) than physical network connections.

In another embodiment, target computers can be selectively included or excluded from particular groups based on predetermined factors or on user input. For example, a target computer can be selectively included or excluded based on known physical limitations, such as bandwidth, memory, physical distance, network distance, or the like. In addition, network boundaries can be established to control the master/target relationships of various devices. In addition, the system can include logic to prevent multiple parallel installations over Wide Area Network ("WAN") setups.

The invention can take the form of an entirely hardware embodiment, an entirely software embodiment, or an embodiment containing both hardware and software elements. For example, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device), or a propagation medium such as a carrier wave. Examples of a computer-readable medium include a semiconductor or solid-state memory, magnetic tape, a removable computer diskette, a random access memory (RAM), a read-only memory (ROM), a rigid magnetic disk and an optical disk.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

We claim:

1. A method of viral installation of operating systems in a network, the method comprising:
   a target computer receiving an operating system image having viral installation code instructions to form a received operating system image, wherein the operating system image is received from a master computer over a network connection;
   the target computer actuating a software switch indicating update status;
   the target computer determining a first associated group of computers, wherein each computer in the first associated group of computers lacks the received operating system image;
   the target computer installing the received operating system image on the first associated group of computers after the target computer determines the first associated group of computers;
   responsive to the target computer installing the received operating system image on the first associated group of computers, the target computer determining that no additional computers can be reached that lack an operating system image; and
   responsive to the target computer determining that no additional computers can be reached that lack an operating system image, the target computer deleting the viral installation code instructions from the target computer.

2. The method of claim 1 wherein the determining the first associated group comprises sending a ping over the network.

3. The method of claim 1 wherein the network is a peer-to-peer network.

4. The method of claim 1 wherein:
the target computer deleting the viral installation code instructions from the target computer is performed after the installing is complete.

5. The method of claim 4 further comprising:
the target computer determining whether additional computers in the network require the received operating system image.

6. A computer program product for viral installation of operating systems in a network, the computer program product comprising:
one or more computer-readable tangible storage devices;
program instructions, stored on at least one of the one or more tangible storage devices, to receive, in a target computer and from a master computer over a network connection, an operating system image to form a received operating system image, wherein the received operating system image has viral installation code instructions;
program instructions, stored on at least one of the one or more tangible storage devices, to actuate a software switch indicating update status;
program instructions, stored on at least one of the one or more tangible storage devices, to determine a first group of computers associated with the target computer, wherein each computer in the first group of computers lacks the received operating system image;
program instructions, stored on at least one of the one or more tangible storage devices, to install the received operating system image from the target computer onto the first group of computers after determining the first group of computers;
program instructions, stored on at least one of the one or more tangible storage devices, to determine that no additional computers can be reached that lack an operating system image, responsive to the target computer installing the received operating system image on the first associated group of computers;
program instructions, stored on at least one of the one or more tangible storage devices, to determine that no additional computers can be reached that lack an operating system image; and
program instructions, stored on at least one of the one or more tangible storage devices, to delete the viral installation code instructions from the target computer, responsive to determining that no additional computers can be reached that lack an operating system image.

7. The computer program product of claim 6, wherein the program instructions to determine the first group of computers comprise program instructions to send a ping over the network.

* * * * *